United States Patent [19]
Divan et al.

[11] Patent Number: 5,596,492
[45] Date of Patent: Jan. 21, 1997

[54] METHOD AND APPARATUS FOR DE-CENTRALIZED SIGNAL FREQUENCY RESTORATION IN A DISTRIBUTED UPS SYSTEM

[75] Inventors: Deepakraj M. Divan; Mukul Chandorkar, both of Madison, Wis.

[73] Assignee: Electric Power Research Institute, Inc., Palo Alto, Calif.

[21] Appl. No.: 259,881

[22] Filed: Jun. 14, 1994

[51] Int. Cl.$^6$ ............................................. H02M 7/44
[52] U.S. Cl. ............................ 363/95; 363/55; 307/64; 307/73
[58] Field of Search ................................ 363/65, 95, 55; 364/492, 483; 307/11, 18, 43, 64–66, 73, 75, 82

[56] References Cited

U.S. PATENT DOCUMENTS

| | | | |
|---|---|---|---|
| 4,096,394 | 6/1978 | Ullmann et al. | 307/46 |
| 5,287,288 | 2/1994 | Brennen et al. | 364/483 |
| 5,446,645 | 8/1995 | Shirahama et al. | 363/71 |
| 5,461,263 | 10/1995 | Helfrich | 307/64 |

OTHER PUBLICATIONS

Chandorkar et al, "Control of Parallel Connected Inverters in Standalone ac Supply Systems", IEEE IAS Trans., Jan./Feb. 1993, pp. 136–143.

Chung, et al., "Parallel Operation of Voltage Source Inverters by Real-Time Digital PWM Control", Conference Proceedings, EPE Florence, 1991, pp. 1–058–1–063.

*Primary Examiner*—Matthew V. Nguyen
*Assistant Examiner*—Adolf Berhane
*Attorney, Agent, or Firm*—Flehr, Hohbach, Test, Albritton & Herbert

[57] ABSTRACT

An Uninterruptible Power Supply (UPS) for de-centralized operation in a distributed UPS system is described. The UPS system includes a number of UPS units that do not have communication links between them and therefore operate in a de-centralized manner. Coordinated operation in the UPS system is achieved through a controller associated with each UPS unit. The controller identifies when the operating power signal frequency on the UPS system does not correspond to a nominal operating frequency. In response to this condition, the controller generates a frequency reference signal that is used to control the inverter of the UPS unit. The controller continuously estimates the fractional loading of the distributed system by gauging the system response to disturbances, and sets its own operating point accordingly. The controller also ensures that the system operates at its nominal frequency independent of loading. As a result, the inverter produces a power signal at the target frequency and with a power level equivalent to the power level associated with each of the UPS units of the UPS system. The performance of the overall system is not sensitive to small differences in the nominal frequency settings of the individual UPS units.

27 Claims, 6 Drawing Sheets

METHOD AND APPARATUS FOR DE-CENTRALIZED SIGNAL FREQUENCY RESTORATION IN A DISTRIBUTED UPS SYSTEM

BRIEF DESCRIPTION OF THE INVENTION

This invention relates generally to uninterruptible power supply (UPS) systems. More particularly, this invention relates to a method and apparatus for de-centralized signal frequency restoration on a line-interactive distributed UPS system.

BACKGROUND OF THE INVENTION

Uninterruptible power supply (UPS) systems operate in conjunction with a main power source (usually a utility) to ensure a continuous supply of energy to critical ac loads, such as medical systems, air traffic control systems, and process control instrumentation. The load power is drawn from the main power source when the main power source is operating. In emergency conditions when the main power source fails, the load power is drawn from the UPS energy source (usually a battery).

There are two main classifications of UPS systems -on-line systems and line-interactive systems. On-line systems carry the load power at all times through the UPS battery charger and inverter. In contrast, line-interactive systems normally do not carry the load power. Instead, under normal conditions they take in battery charging power from the main power supply through the inverter. In emergency conditions when the main power source fails, the line-interactive system supplies the power to the load.

A line-interactive UPS consists of three sections—a battery, an inverter, and a filter. The battery provides dc power when the main power source fails. The dc power is converted to ac power by the inverter. The filter conditions the ac power before the power is delivered to the load. The bi-directional power handling capability of the inverter is utilized to charge the battery from the main power supply under normal operating conditions.

A number of line-interactive UPS systems can be interconnected to form a line-interactive distributed UPS system. Such a system is also known as a "secure network" since a number of paths are available to provide power to the various loads on the network. That is, different UPS units can be used to provide load power in case one of the UPS units on the network fails.

The control scheme of a distributed UPS system should not depend on signal communication between the various UPS units. The use of communication reduces the reliability of the distributed system as a whole, since the control is then critically dependent on the operation of the communication link. In addition, due to the complexity of the network, it is impractical to obtain the detailed control action for a distributed UPS network, even if the information could be conveyed to a central point.

If the voltage and frequency of the main power source degrades beyond acceptable limits, the main power source is rapidly disconnected from the secure network, resulting in an emergency condition. In an emergency condition, distributed UPS systems can, in principle, be controlled through a known power-frequency droop concept.

While there are known techniques for operating a distributed UPS system and for sharing power between various UPS units of a distributed UPS system during emergency conditions, a problem persists in defining an appropriate control mechanism to establish a desired frequency for the power signal of the distributed UPS system. This factor becomes critical in two contexts. First, assuming the use of the power-frequency droop concept to achieve power sharing between UPS units, a distributed UPS system operating under emergency conditions will experience frequency shifts as loads change on the critical network. Consequently, it is necessary to provide a mechanism to restore the power signal frequency to a desired level. Second, following re-connection of the main power source to the secure network after emergency operation, the load power must be smoothly transferred to the main source through de-centralized control.

Thus, it would be highly desirable to provide a control mechanism for a distributed UPS system that allows adjustment of the power signal frequency of the distributed UPS system to accommodate load changes and re-connection to the main power supply. Moreover, such a control mechanism should be accomplished without control signals between the UPS units of the distributed UPS system. It would also be desirable if the control scheme was operable with a random number of UPS units on the distributed system. Similarly, the location of the loads should not alter the control scheme. In addition, the control scheme should readily accommodate UPS units of different power ratings.

SUMMARY OF THE INVENTION

The invention provides an Uninterruptible Power Supply (UPS) for de-centralized operation in a distributed UPS system. The UPS system includes a number of UPS units that do not have communication links between them and therefore operate in a de-centralized manner. Coordinated operation in the UPS system is achieved through a controller associated with each UPS unit. The controller identifies when the operating power signal frequency on the UPS system does not correspond to a nominal operating frequency. In response to this condition, the controller generates a frequency restoration reference signal that is used to control the inverter of the UPS unit. The controller continuously estimates the fractional loading of the distributed system by gauging the system response to disturbances, and sets its own operating point accordingly. The controller also ensures that the system operates at its nominal frequency independent of loading. As a result, the inverter produces a power signal at the nominal frequency and with a power level equivalent to the power level associated with each of the UPS units of the UPS system. The performance of the overall system is not sensitive to small differences in the nominal frequency settings of the individual UPS units.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
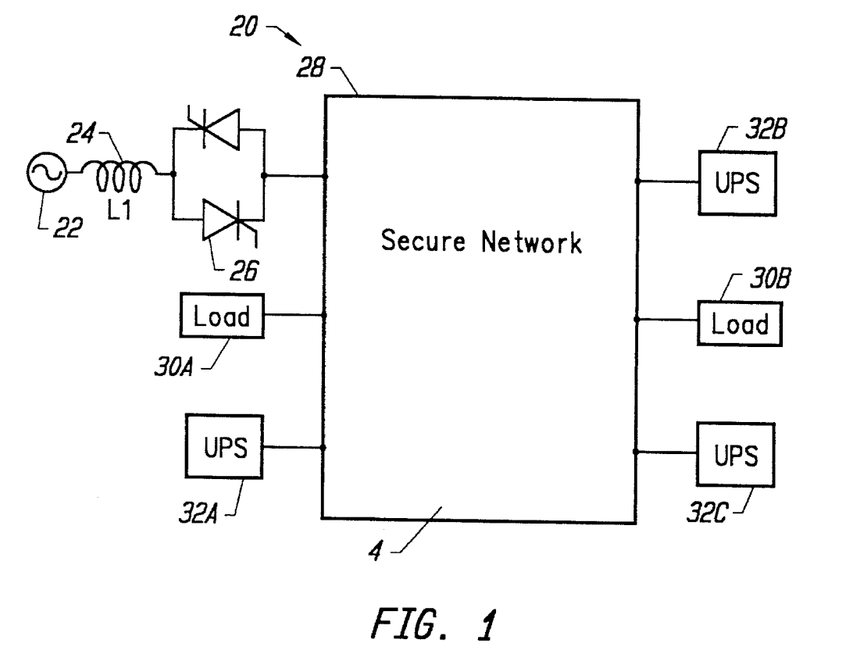
FIG. 1 is an illustration of a line-interactive distributed UPS system in accordance with the present invention.

FIG. 1 illustrates a line-interactive distributed UPS system 20, also referred to herein as a secure network. A main power supply 22 delivers power through an isolating inductor 24 and solid state switches 26 to the load bus 28 of the secure network 20. The secure network 20 includes a number of loads 30A, 30B that are powered by the main power supply 22 under normal operating conditions. When the main power supply 22 fails, the loads 30A, 30B are powered by a set of UPS units 32A, 32B, 32C. By way of example, the secure network of FIG. 1 is a three-phase, four-wire system.

It should be noted that the system in FIG. 1 is similar to an interconnected power system. However, the power sources have different characteristics. The UPS units 32 have a much lower output impedance than a generator. Further, unlike a generator which has mechanical inertia, the UPS units can change their output voltage vector very rapidly. The response of the distributed LIPS system 20 is predominantly determined by the control systems of the UPS units 32.

This invention is directed toward two major control issues associated with a line-interactive distributed UPS system 20. The first control issue is handling load changes while the secure network 20 is being powered by the individual UPS units 32. The second control issue is re-connecting the secure network 20 to the main power supply 22. Each problem entails the establishment of a proper frequency level for the power signal generated by the individual UPS units 32. The control functions of the invention are executed by a control unit associated with each UPS unit 32. There is no data communication between control units of the LIPS units of the network.

Figure 2:
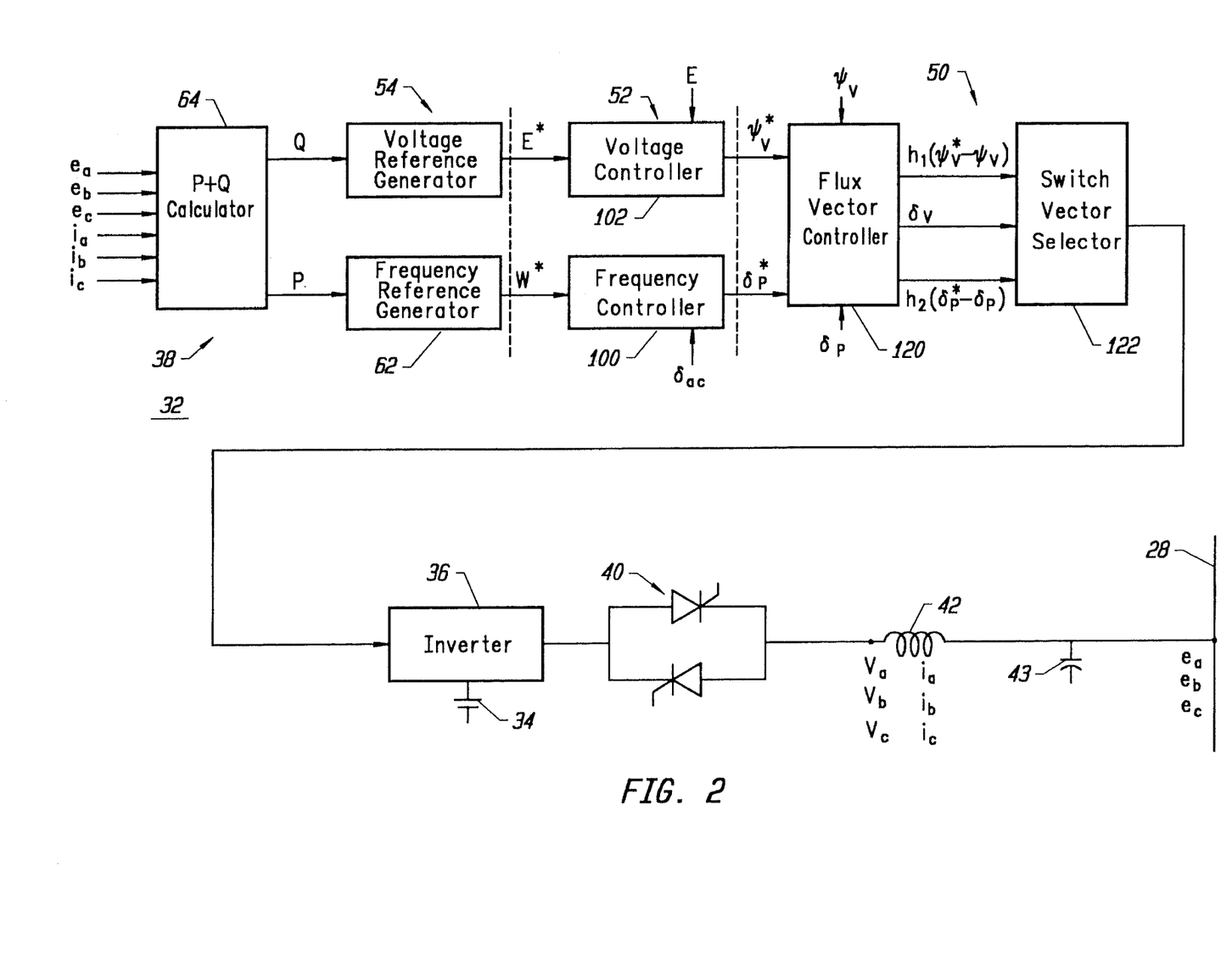
FIG. 2 is a schematic illustration of the UPS controller of the invention.

FIG. 2 illustrates a UPS unit 32. Each UPS unit 32 includes a dc power source 34 connected to an inverter 36. By way of example, the invention is disclosed in relation to a six-pulse GTO voltage sourced inverter. A controller 38 provides the proper gate signals for the solid state switches of the inverter 36, so as to convert the dc power into ac power. The ac power is fed through solid state switches 40 and inductor 42 to the bus 28 of the secure network 20. Inductor 42 and capacitor 43 serve as a low-pass filter.

The controller 38 has three control loops. The inner control loop 50 controls the inverter switches. The middle loop 52 produces the set-points for the inner loop in order to achieve the specified magnitude and frequency for the secure network voltage vector. The outer loop 54 implements frequency and voltage magnitude variation characteristics to ensure the sharing of real power P and reactive power Q between the parallel-connected UPS units 32. The frequency variation characteristics of the outer control loops 54 and 52 permit the parallel operation of the various UPS units connected to the secure bus. This is similar to the manner in which multiple generators with different ratings, or multiple generating areas, are controlled in interconnected power systems.

Attention presently turns to the outer loop 54 of the controller 38. The outputs of the outer loop 54 are the setpoints $\omega^*$ and $E^*$, which are used to ensure correct real and reactive power sharing between the parallel connected UPS units 32. The voltage setpoint $E^*$ is established with a voltage reference generator 60. The frequency reference $\omega^*$ is established with a frequency reference generator 62.

The input to the voltage reference generator 60 is the reactive power value Q, while the input to the frequency reference generator 62 is the real power value P. The reactive power value Q and the real power value P are generated by a P&Q calculator 64. The P&Q calculator 64 is programmed to execute a set of operations on the input signals $e_a$, $e_b$, $e_c$, $i_a$, $i_b$, and $i_c$, where $e_a$, $e_b$, and $e_c$ are the secure network bus 28 voltages, and $i_a$, $i_b$, and $i_c$ are the input currents to the secure network bus 28. Preferably, a transformation from the physical a-b-c reference frame to the stationary d-q-n reference frame is performed by the P&Q calculator 64. This transformation is described by the following equations.

$$f_d = \frac{2}{3}\left(-\frac{\sqrt{3}}{2}f_b + \frac{\sqrt{3}}{2}f_c\right) \quad \text{(Eq. 1)}$$

$$f_q = \frac{2}{3}\left(f_a - \frac{1}{2}f_b - \frac{1}{2}f_c\right) \quad \text{(Eq. 2)}$$

$$f_n = \frac{2}{3}\left(\frac{1}{\sqrt{2}}f_a + \frac{1}{\sqrt{2}}f_b + \frac{1}{\sqrt{2}}f_c\right) \quad \text{(Eq. 3)}$$

Figure 3:
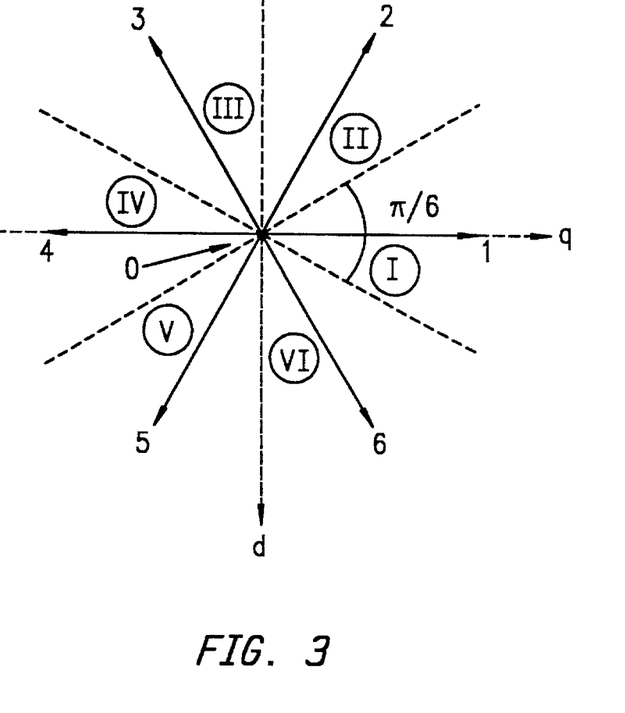
FIG. 3 illustrates inverter output voltage space vectors that may be used in the UPS controller of the invention.

In these equations, the quantity f generically denotes a physical quantity, such as a voltage (e.g., $e_a$) or a current (e.g., $i_a$). In the absence of a neutral connection, the quantity $f_n$ is of no interest. For a six-pulse voltage sourced inverter, the inverter output voltage space vector can take any of seven positions in the plane specified by the d-q coordinates. These are shown in FIG. 3 as the vectors 0–6. The time integral of the inverter output voltage space vector is called the "inverter flux vector" for short. The flux vector is a fictitious quantity related to the volt-seconds in the filter inductor. The d and q axis components of the inverter flux vector $\psi_v$ are defined as $$\psi_{dv} = \int_{-\infty}^{t} v_d d\tau \quad \text{(Eq. 4)}$$

$$\psi_{qv} = \int_{-\infty}^{t} v_q d\tau \quad \text{(Eq. 5)}$$

The magnitude of $\psi_v$ is $$\psi_v = \sqrt{\psi_{qv}^2 + \psi_{dv}^2} \quad \text{(Eq. 6)}$$

The angle of $\psi_v$ with respect to the q axis is $$\delta_v = \tan^{-1}\left(-\frac{\psi_{dv}}{\psi_{qv}}\right) \quad \text{(Eq. 7)}$$

The d and q axis components of the ac system voltage flux vector $\psi_e$, its magnitude, and angle are defined in a similar manner. The angle between $\psi_v$ and $\psi_e$ is defined as $$\delta_p = \delta_v - \delta_e \quad \text{(Eq. 8)}$$

The foregoing equations provide a convenient means to define the power angle since the inverter voltage vector switches position in the d-q plane, whereas there is no discontinuity in the inverter flux vector. It is useful to develop the power transfer relationships in terms of the flux vectors. The basic real power transfer relationship for the d-q reference frame is:

$$P = \tfrac{3}{2}(e_q i_q + e_d i_d) \quad \text{(Eq. 9)}$$

In equation 9, $e_q$ and $e_d$ are the q- and d-axis components, respectively, of the ac system voltage vector E. In addition, $i_q$ and $i_d$ are the components of the current vector I. When $i_q$ and $i_d$ are expressed in terms of the fluxes, the equation is expressed as $$P = \frac{3}{2L_f}\left[e_q(\psi_{qv} - \psi_{qe}) + e_d(\psi_{dv} - \psi_{de})\right] \quad \text{(Eq. 10)}$$

Taking into account the spatial relationships between the two flux vectors and assuming the ac system voltage to be sinusoidal, Equation 10 can be expressed as $$P = \frac{3}{2L_f}\,\omega\,\psi_e\psi_v\sin\delta_p \quad \text{(Eq. 11)}$$

In this expression, $\psi e$ and $\psi v$ are the magnitudes of the ac system and the inverter flux vectors, respectively, and $\delta p$ is the spatial angle between the two flux vectors. $\omega$ is the frequency of rotation of the two flux vectors. The expression for reactive power transfer can be derived in a similar manner to yield:

$$Q = \frac{3}{2}\,\frac{\omega}{L_f}\,[\psi_v\psi_e\cos\delta_p - \psi_e^2] \quad \text{(Eq. 12)}$$

Equations 11 and 12 indicate that P can be controlled by controlling $\delta p$, which can be defined as the power angle, and Q can be controlled by controlling $\psi v$. The cross coupling between the control of P and Q is also apparent from these equations.

In any event, the foregoing equations are used to generate the real power value P which is conveyed to the frequency reference generator 62 and the reactive power value Q which is conveyed to the voltage reference generator 60. The present invention is particularly related to the frequency reference generator 62. In the prior art, the frequency reference generator 62 establishes a frequency reference signal $\omega^*$ according to the following equation:

$$\omega_i^* = \omega_o - m_i(P_{oi} - P_i) \quad \text{(Eq. 13)}$$

In this equation, i is the index number of the UPS unit in question, $\omega_i^*$ is the frequency set-point for the ith UPS unit, and $\omega_o$ is the nominal system frequency (typically 60 Hz). The nominal system frequency will also be referred to herein as the target frequency. $P_{oi}$ is the actual power rating of the ith UPS unit, and $P_i$ is its actual power level loading. The term $m_i$ is the slope of a curve that characterizes the relationship between frequency and power rating.

Figure 4:
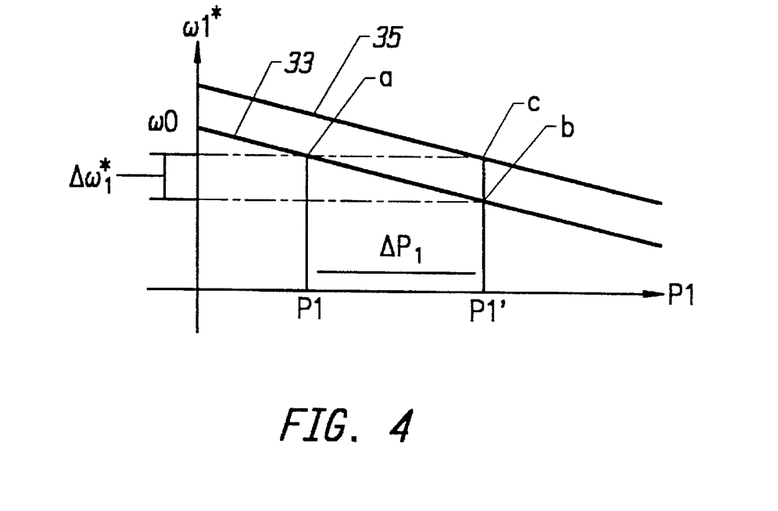
FIG. 4 illustrates the relationship between UPS system frequency and UPS unit power level loading in a distributed UPS system.

Lines 33 and 35 in FIG. 4 illustrate the curve corresponding to Equation 13. This curve is sometimes called a "droop curve". The values of $m_i$, the slope of the lines 33 and 35, for different inverters determine the relative power sharing between the inverters. Note in FIG. 4 that a change in power loading (P1 to P1') corresponds to a change in frequency. Thus, it can be appreciated that the frequency effects the power loading.

In typical systems, the P–$\omega^*$ characteristics are stiff, meaning that the frequency change from no load to full load is extremely small. If the slopes $m_i$ for different inverters are chosen such that $$m_1 P_{O1} = m_2 P_{O2} = m_n P_{On} \quad \text{(Eq. 14)}$$

then the UPS units share the total load on the secure network in proportion to their power ratings. Power sharing according to equation 14 is independent of the number of UPS units actually connected to the secure network, and does not need any data communication between the UPS controllers.

The voltage reference set point E* is established by the voltage reference generator 60 in a similar fashion. Specifically, the setpoint $E_i^*$ for the ac system voltage is described by the following equation.

$$E_i^* = E_o - n_i(Q_{oi} - Q_i) \quad \text{(Eq. 15)}$$

In equation 15, $E_o$ is the nominal voltage on the ac system, $Q_{Oi}$ is reactive power rating, $Q_i$ is the reactive power supplied by the ith inverter, and $n_i$ is the slope of the droop characteristic. Equation 15 insures the desired reactive power sharing between the UPS units 22.

Returning now to the frequency reference generator 62, as shown in relation to FIG. 4 and Equation 13, the overall system frequency will change with changing loads. It is desirable to have a steady-state operating frequency which is independent of the load. The present invention is directed toward achieving this operation. This function is accomplished with a frequency restoration procedure that provides a steady-state operating frequency independent of the load, while maintaining load sharing between the UPS units. This frequency restoration procedure is aim useful when reconnecting the secure network to the main power supply 22.

The invention provides a frequency restoration mechanism to return the overall system frequency back to the nominal value following arbitrary load changes. The frequency restoration is achieved by having one common parameter programmed in the controllers of all the UPS units connected to the overall system—the rate of frequency restoration. Each UPS unit attempts to restore its frequency to the nominal value at a rate which is determined by the locally measured response of the rest of the distributed system. By this means, the overall system frequency can be restored to its nominal value while maintaining the desired power sharing between the UPS units, and without using centralized control data communication. This control scheme also permits the automatic transfer of power to the main power source following a temporary outage.

FIG. 4 illustrates how the overall system frequency changes with changing loads. In this FIG, the condition before a load change is shown by point "a", with nominal operating frequency $\omega_o$. After the load change, the operating point shifts to "b", with a lower operating frequency.

As previously indicated, it is desirable to have a steady-state operating frequency which is independent of load. To achieve this, the curve has to be shifted up to pass through point "c". This restores the frequency to its nominal value $\omega_o$, and at the same time ensures correct power sharing. It is crucial for distributed UPS operation that the shifting of the frequency is accomplished without data communication between the controllers. In addition, power sharing cannot be ensured if the frequency is changed at an arbitrary rate. By way of example, if the $P_1-\omega_1^*$ characteristic alone is shifted, and none of the other $P_i-\omega_i^*$ characteristics are shifted, then UPS-1 will have taken up all the load sharing.

In order for the frequency to be restored to its nominal value, it must be ensured that $P_{Oi}=P_i$. That is, the actual power rating of a selected UPS unit must match its actual power level loading. If this condition is satisfied, then it can be seen from Equation 13 that the actual frequency will match the nominal frequency.

Shifting the characteristics of FIG. 4 to restore the overall system frequency is equivalent to modifying the $P_{Oi}$ values. In accordance with the invention, the rates of change of the quantities $P_{oi}$ are chosen such that $$dP_{Oi}/dt = kP_{iR}\Delta\omega_i \qquad \text{(Eq. 16)}$$

In Equation 16, $P_{Oi}$ is the actual power rating of the ith UPS unit, k is a frequency restoration constant which determines the rate at which the frequency is restored following a load change, and $P_{iR}$ is the nominal power rating of the ith UPS unit. The frequency errors measured by the UPS units are $\Delta\omega_i=\omega_o-\omega_i$, where the subscript i refers to the ith UPS unit in the distributed system. If the slopes $m_i$ for all the n units in the disturbed UPS system are chosen such that $$m_1 P_{1R} = m_2 P_{2R} = m_n P_n R \qquad \text{(Eq. 16a)}$$

then the frequency error decays exponentially to zero, and the load sharing is maintained throughout the frequency restoration process.

Note then that the actual power rating of the ith UPS unit is a function of the power signal operating frequency. When the operating frequency of the system is changed, the actual power rating is modified to restore the operating frequency to its target (nominal) frequency. As the desired power rating is obtained, the desired system frequency is simultaneously obtained.

It is important to note that the frequency restoration technique is not contingent upon the number or size of the UPS units connected to the secure network. Moreover, there is no need to modify the controllers of existing UPS units when a new UPS unit load is connected onto the secure bus, for example when expanding the system. It is only necessary to set the slope of the new UPS unit to satisfy Equation 16a, and to set the gain for frequency restoration, k, the same as for all the other existing UPS units. This one-time coordination of the new UPS unit makes it operate in harmony with the rest of the distributed UPS network 20, in the presence of arbitrarily varying loads and a locally unknown number of operational UPS units and loads in the rest of the system.

Figure 5:
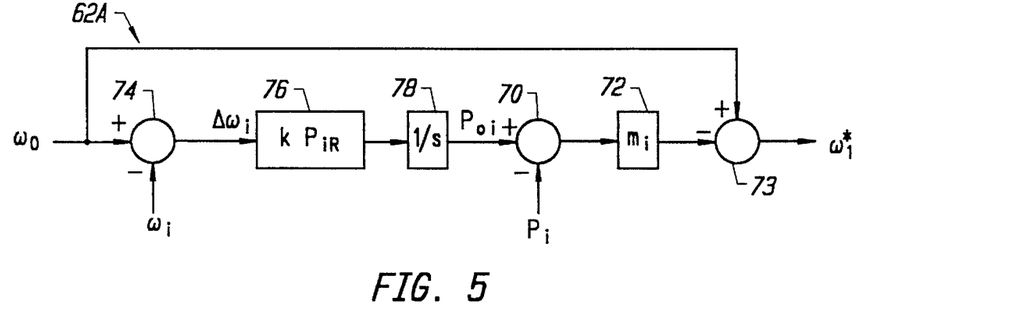
FIG. 5 illustrates the primary control loop of the controller of the invention.

A frequency restoration reference generator for implementing the data processing of the invention is disclosed in FIG. 5. Note that mixer 70, multiplier 72, and mixer 73 perform the known operation described in Equation 13. Mixer 74, multiplier 76, and integrator 78 are used to execute the operation of Equation 16. That is, mixer 74 is used to obtain a delta power signal frequency value, multiplier 76 multiplies the delta power signal frequency value by a frequency restoration constant k and the nominal power rating value of the ith UPS unit to produce a first intermediate frequency restoration signal that is integrated by integrator 78 to generate the actual power rating signal $P_{oi}$. Mixer 70 is used to subtract the actual power level loading signal $P_i$ from the actual power rating signal $P_{oi}$ to produce a power difference signal. The power difference signal is multiplied by the slope value mi to produce a generated frequency value that is subtracted from the nominal power signal frequency $\omega_o$ to produce the frequency restoration reference signal $\omega_i^*$.

The frequency restoration reference generator 60 can be further modified to handle the re-connection of the secure network 20 to the main power source 22. This can be accomplished with the controller of FIG. 6. In essence, the device of FIG. 6 tests the stiffness of the system frequency. With the main power source connected, the system frequency is very stiff (there is little deviation from the nominal value). This is due to the fact that the main power source produces a power signal with a frequency that typically lies within a very narrow tolerance band, and so the main power system represents a source with virtually no frequency droop, while the UPS units operate with a relatively large droop from the nominal frequency. This fact permits each UPS unit 32 connected to the secure network 20 to detect the presence of the main power source.

Figure 7:
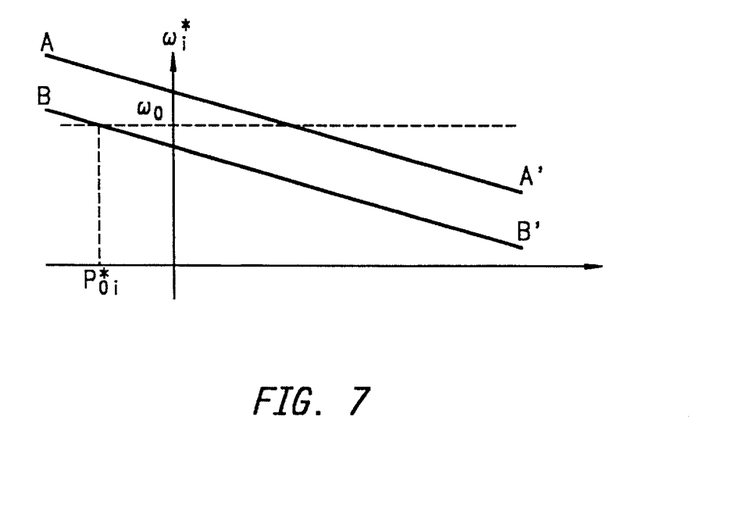
FIG. 7 illustrates the relationship between UPS system frequency and UPS unit power level loading in a distributed UPS system in emergency and in normal operation.

FIG. 7 shows the desired operating characteristics of any one of the UPS units connected to the secure network, both before and after re-connection to the main power source. Before re-connection to the main power source, the UPS unit operating characteristic is denoted by the line AA'. This characteristic permits power delivery from the UPS unit to the secure network. After the mains has been re-connected to the secure network, the unit operating characteristics are shifted to the line BB'.

Figure 6:
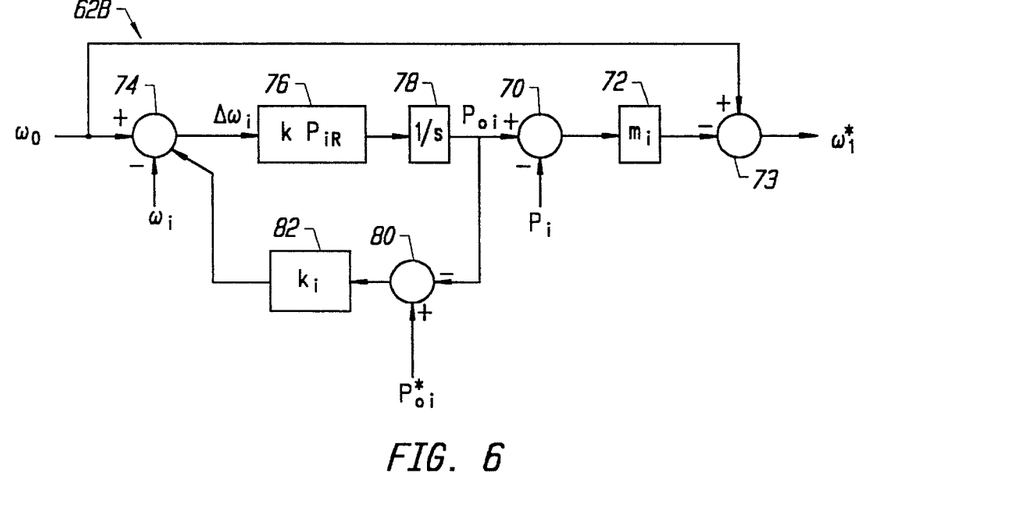
FIG. 6 illustrates the controller of the invention with a feedback loop to accommodate re-connection of the secure UPS network to a primary power source.

FIG. 6 shows the controller of FIG. 5 modified to include a reference power rating signal ($P_{oi}^*$)—the power desired to be drawn by the UPS unit from the main power source after re-connection. This new power set point is designated $P_{oi}^*$ for the ith UPS unit in the secure network. The inclusion of a control loop for $P_{oi}$ tends to reduce the frequency until $P_{oi}=P_{oi}^*$. The dependency of $P_{oi}$ on frequency is shown in Equation 16.

When the main power source is not connected, the actual frequency $\omega_i$ is slightly less than the desired nominal frequency $\omega_o$, by an amount determined by the error in $P_{oi}$, established at mixer 80, and the gain $k_i$, established at multiplier 82. The gain $k_i$ can be chosen such that the deviation in frequency from the nominal value is well within frequency tolerance specifications.

When the utility is reconnected, the difference between the nominal frequency and the secure network frequency tends to draw power from the main power source, decreasing $P_i$ in the process. However, the frequency $\omega_i$ is prevented from increasing by the $P_{oi}$ controller (mixer 80 and multiplier 82), and so $P_i$ continues to decrease. That is, the mixer 80 produces a power rating error signal that is multiplied by a gain value $K_i$ at multiplier 82 to produce a power rating feedback signal that prevents the actual power signal frequency $\omega_i$ from increasing. This process continues until $P_i=P_{oi}=P_{oi}^*$ and $\omega_i=\omega_o$. At this point, the operating characteristic has shifted from the line AA' to the line BB', as shown in FIG. 7.

The gains ki are coordinated on the basis of operation with the main power source disconnected. In this case, FIG. 6 indicates that the steady state values of $P_{oi}$, are given by $$P_{oi}=(\omega_o-\omega_i^*)/Ki+P_{oi}^* \qquad \text{(Eq. 17)}$$

Since in steady state the overall system frequency is the same at all the UPS units, the following relationship holds for all the UPS units:

$$m_1(P_{o1}-P_1)= \ldots =m_i(P_{oi}-P_i)=m_n(P_{on}-P_n) \qquad \text{(Eq. 18)}$$

So that $$m_1/k_1(\omega_o-\omega_1^*)+m_1(P_{oi}^*-P_1)=\ldots=m_i/k_i(\omega_o-\omega_i^*)+m_i(P_{oi}^*-P_i)$$

(Eq. 19)

Noting that $\omega_1^*=\ldots=\omega_i^*=\ldots=\omega_n^*$, the values of the gains $k_i$ are set such that $$m_1/k_1=m_i/k_i=m_n/k_n \quad \text{(Eq. 20)}$$

This condition ensures desired load sharing between the UPS units.

As previously indicated, the outputs of the outer loop 54, E* and $\omega$*, are fed to the remaining processing elements of the controller 38. The remaining processing elements of the controller 38 are known in the art. By way of overview, their operation can be described as follows.

Figure 8:
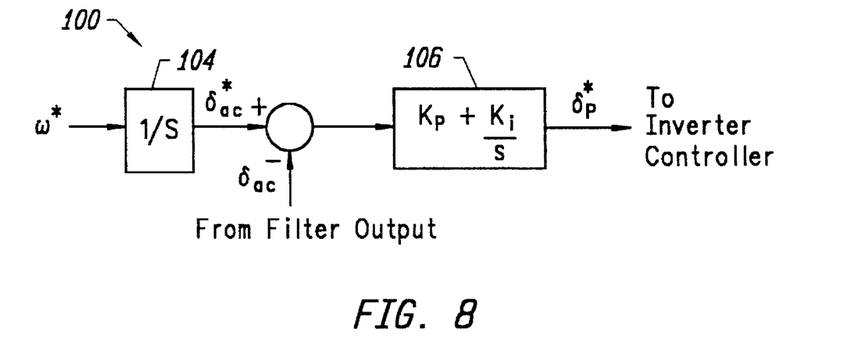
FIG. 8 illustrates a frequency controller that may be used in accordance with the invention.

The frequency controller 100 produces a frequency controller reference signal $\delta_p^*$ that is needed to attain the specified frequency. The structure of the frequency controller is given in FIG. 8. The frequency setting $\omega$* is processed by integrator 104 to obtain a reference $\delta_{ac}^*$ for the position of the ac system voltage vector across filter capacitor 43. This value is compared with the actual position $\delta_{ac}$. The error is used to drive a P-I regulator 106, which produces the setpoint $\delta_p^*$.

The voltage controller 102 produces a voltage controller reference signal $\psi v^*$ that is needed to attain the specified ac system voltage magnitude. The structure of the voltage controller is given in FIG. 9. The controller command input is E*, which is the specified value of the magnitude of E. This value is applied to multiplier 108 which has command feedforward term defined as $$E^*[(1-\omega^2 L_f C_f)/\omega] \quad [\text{Eq. 21}]$$

Figure 9:
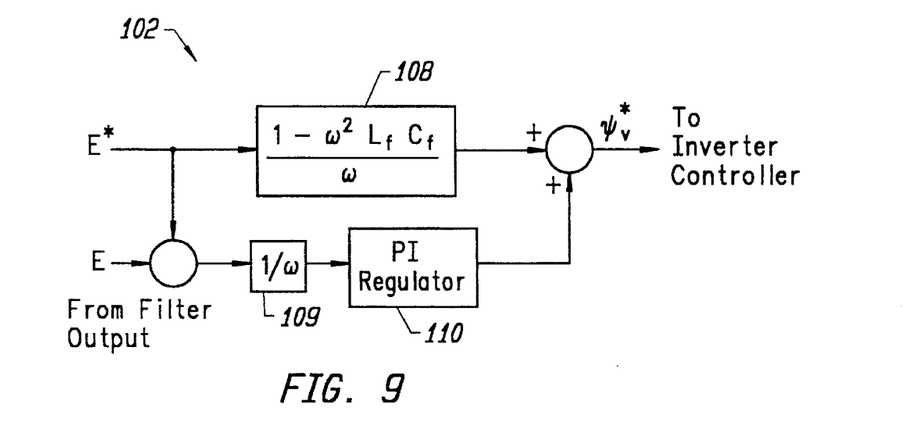
FIG. 9 depicts a voltage controller that may be used in accordance with the invention.

The voltage magnitude feedback term is used to generate an error signal that is applied to multiplier 109 and is then applied to P-I controller 110. The command feedforward term and the voltage magnitude feedback term are combined to give the value of $\psi v^*$, needed to achieve the specified E* with an unloaded filter and is intended to speed up the voltage control loop.

Figure 10:
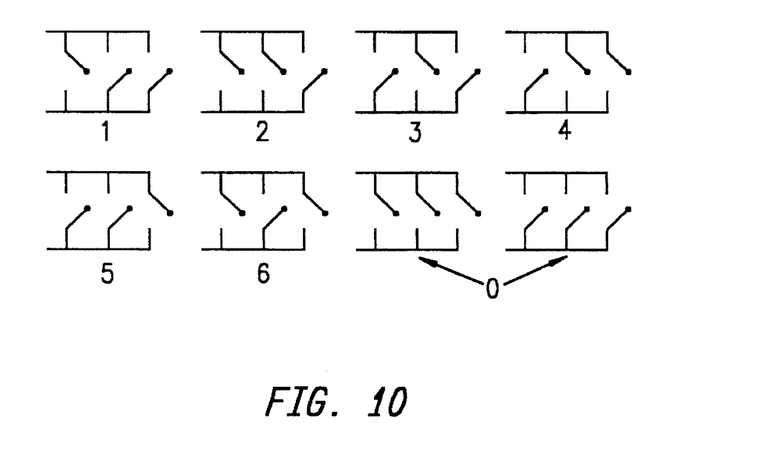
FIG. 10 illustrates inverter gate switch combinations that are selected by the switch vector selector of the invention.

A flux vector controller 120, of the inner loop 50, receives the derived $\psi_v^*$ and $\delta_p^*$ values from the voltage controller 102 and frequency controller 100. The choice of the inverter switching vector is made on the basis of the deviations of $\psi_v$ and $\delta_p$ from the set values $\psi_v^*$ and $\delta_p^*$ and the position of the inverter flux vector in the d-q plane given by $\delta_v$ (Equation 7). If the deviation of $\delta_p$ (Equation 8) from $\delta_p^*$ is more than a specified limit, a zero switching vector is chosen. If this deviation is less than a specified limit or if $\psi_v$ deviates from $\psi_v^*$ by more than a specified amount, a switching vector that increases $\delta_p$ and changes $\psi_v$ in the correct direction is chosen. This can be accomplished by hysteresis comparators for the set values and then using a look-up table to choose the correct inverter output voltage vector. The choice of inverter switching vector is dictated by the value of $\delta_v$, and the errors in $\psi_v$ and $\delta_p$. The d-q plane is divided into six sectors for $\delta_v$ as shown in FIG. 3. The inverter switch positions for the vectors are shown in FIG. 10. The value $\delta_v$ determines the choice of two possible inverter switching vectors apart from the zero vector. One vector increases the magnitude $\psi_v$ and the other decreases it, whereas both tend to increase $\delta_p$. Thus, to decrease $\delta_p$, the zero switching vector is chosen. To correct the value of $\delta_v$, one of the two active switching vectors is chosen, depending on the sign of the correction required. The following table gives the choice of active vectors for given positions of the inverter flux vector, which is specified by $\delta_v$.

| | Sector No. (Location of $\psi v$) | | | | | |
|---|---|---|---|---|---|---|
| | I | II | III | IV | V | VI |
| Increase $\psi_v$ | 2 | 3 | 4 | 5 | 6 | 1 |
| Decrease $\psi_v$ | 3 | 4 | 5 | 6 | 1 | 2 |

Thus, the flux vector controller 120 produces three control signals. The first signal is $\delta_v$ (Equation 7), which is the instantaneous position of the inverter flux vector $\delta_v$. The second signal is the binary signal $h_1(\psi_v^*-\psi_v)$, and is 1 when the error $\psi_v^*-\psi_v$ is greater than the upper limit of the hysteresis band, and 0 when the error is less than the lower limit. The third signal is the binary signal $h_2(\delta_p^*-\delta_p)$, and performs the same hysteresis function.

These three signals are passed to a switch vector selector 122 which, relying upon the table given above, selects a vector value. The vector value is converted by the switch vector selector 122 to gate drive signals for the inverter 36. That is, the switch vector selector 122 generates gate signals to realize the switch combinations shown in FIG. 10. In this manner, $\psi v$ and $\delta_p$ are tightly controlled to lie within specified hysteresis bands by means of inverter switching.

Figure 11:
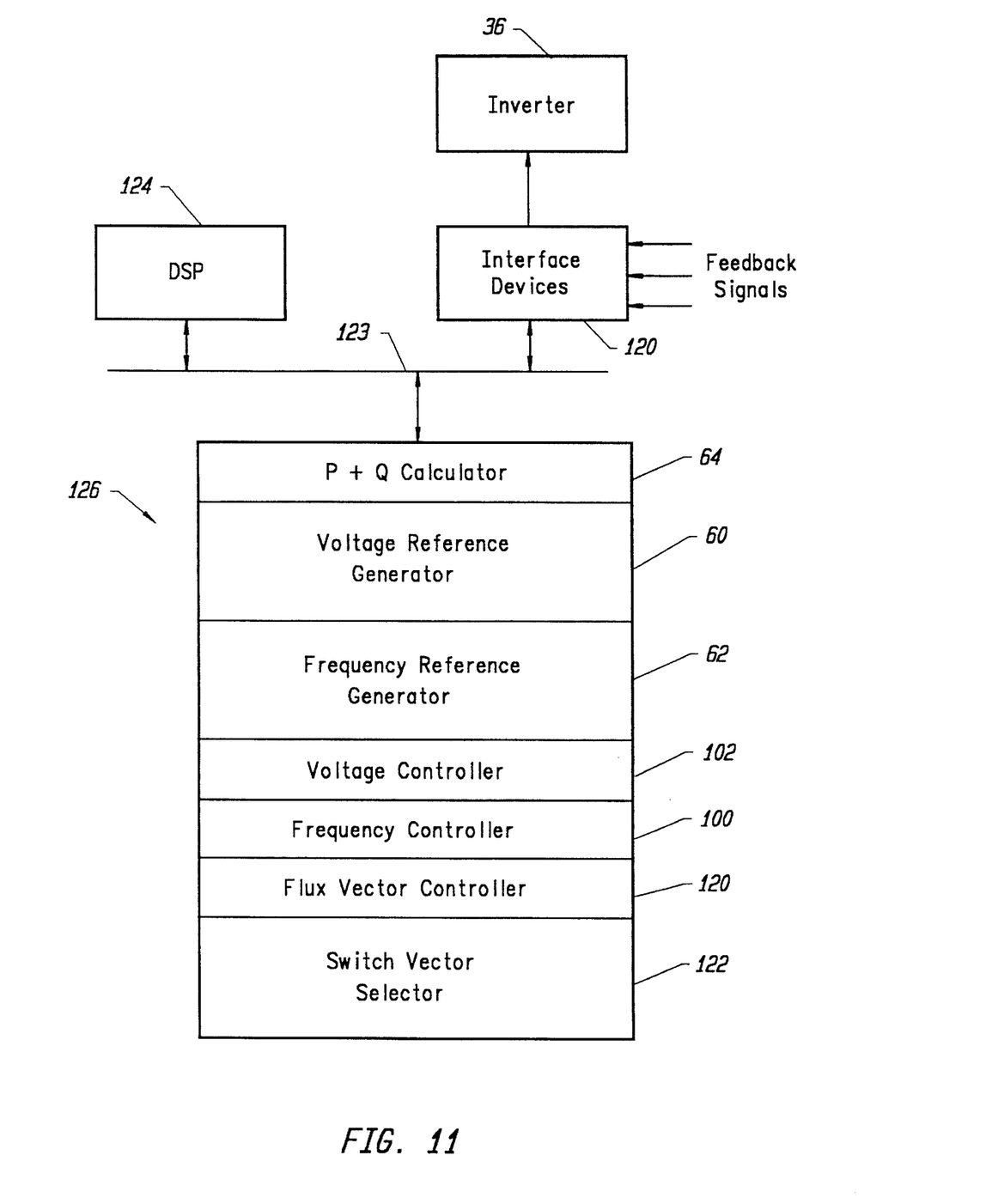
FIG. 11 depicts a digital embodiment of the UPS controller of the invention.

FIG. 11 illustrates a digital embodiment of the apparatus of the present invention. The apparatus includes interface devices 120 which include analog-to-digital converters for receiving the feedback signals shown in FIG. 2, and digital-to-analog converters for producing the frequency restoration gate drive signals for the inverter 36. The interface devices 120 are coupled to a bus 123 which is in communication with a Digital Signal Processor (DSP) 124 and a memory 126. The memory 126 stores a set of programs for executing the analog operations described in relation to FIG. 2. Specifically, the memory 126 stores a P&Q calculator 64, a voltage reference generator 60, a frequency reference generator 62, a voltage controller 102, a frequency controller 100, a flux vector controller 120, and a switch vector selector 122.

Those skilled in the art will recognize a number of benefits associated with the present invention. Primarily, the invention provides a control mechanism that allows adjustment of the power signal frequency of a distributed UPS system in a manner that accommodates load changes and re-connection to the main power supply, while maintaining power sharing between the UPS units. In addition, this control mechanism is accomplished without control signals between the UPS units of the distributed UPS system. The inputs to the control mechanism are all locally obtained, thereby reducing system cost and enhancing system reliability. It can also be appreciated that the control scheme is operable with a random number of UPS units on the distributed system, and the location of the loads does not alter the control scheme. Finally, the control scheme readily accommodates UPS units of different power ratings.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and de, scribed in order to best explain the principles of the invention and its practical applications, to thereby enable others skilled in the art to best utilize the invention and various embodiments with various modifications as are suited to the particular use contemplated. It is intended that the Scope of the invention be defined by the following claims and their equivalents.

We claim:

1. An Uninterruptible Power Supply unit for connection to an Uninterruptible Power Supply system that includes a plurality of similarly controlled Uninterruptible Power Supply units that do not have communication links therebetween, said Uninterruptible Power Supply unit comprising:

a power bus node for connection to a power bus that has a plurality of loads and said plurality of Uninterruptible Power Supply units connected thereto, said power bus carrying a power signal with an operating frequency distinct from a nominal power signal frequency;

an inverter connected to said power bus node; and a controller to generate a frequency restoration reference signal ($\omega_i^*$) used to produce gate drive signals for said inverter, wherein said controller
receives a nominal power signal frequency signal ($\omega_o$), an actual Dower signal frequency signal($\omega_i$), and an actual power level loading signal ($P_i$) measured locally at said Uninterruptible Power Supply unit,
subtracts said actual power signal frequency signal from said nominal power signal frequency signal to produce a delta power signal frequency signal($\Delta\omega_i$), and
multiplies said delta power signal frequency signal ($\Delta\omega_i$) by the product of a frequency restoration constant (k) and a nominal power rating value ($P_{iR}$) to yield a first intermediate frequency restoration signal.

2. The Uninterruptible Power Supply unit of claim 1 wherein said controller integrates said first intermediate frequency restoration signal to produce an actual power rating signal ($P_{oi}$).

3. The Uninterruptible Power supply unit of claim 2 wherein said controller subtracts said actual power level loading signal ($P_i$) from said actual power rating signal ($P_{oi}$) to produce a power difference signal.

4. The Uninterruptible Power Supply Unit of claim 3 wherein said controller multiplies said power difference signal by the slope ($m_i$) of a frequency-power curve to yield a generated frequency value signal.

5. The Uninterruptible Power Supply Unit of claim 4 wherein said controller subtracts said generated frequency value signal from said nominal power frequency signal value signal ($\omega_o$) to produce said frequency restoration reference signal ($\omega_i^*$).

6. The Uninterruptible Power Supply unit of claim 5 wherein said controller subtracts said actual power rating signal ($P_{oi}$) from a reference power rating signal ($P_{oi}^*$) to produce a power rating error signal.

7. The Uninterruptible Power Supply unit of claim 6 wherein said controller multiplies said power rating error signal by a gain value ($K_i$) to produce a power rating feedback signal.

8. The Uninterruptible Power Supply unit of claim 7 wherein said controller adds said power rating feedback signal to said delta power frequency signal ($\Delta\omega_i$).

9. The Uninterruptible Power Supply unit of claim 1 wherein said controller further comprises a P&Q calculator that receives a set of power bus voltage values and Uninterruptible Power Supply output current values and produces a real power signal (P) and a reactive power signal (Q).

10. The Uninterruptible Power Supply unit of claim 9 wherein said controller further comprises a frequency restoration reference generator that receives said real power signal and produces said frequency restoration reference signal ($\omega_i^*$); and a voltage reference generator that receives said reactive power signal (Q) and produces a voltage reference signal (E*).

11. The Uninterruptible Power Supply unit of claim 7 wherein said controller further comprises a frequency controller to receive said frequency restoration reference signal ($\omega_i^*$) and generate a frequency controller reference signal ($\delta_p^*$).

12. The Uninterruptible Power Supply unit of claim 11 wherein said controller further comprises a voltage controller that receives said voltage reference signal (E*) and produces a voltage controller reference signal ($\psi_v^*$).

13. The Uninterruptible Power Supply unit of claim 12 wherein said controller further comprises a flux vector controller that receives said frequency restoration reference signal and said voltage controller reference signal to produce flux vector control signals ($\delta_v$),$h_1(\psi_v^*-\psi_v)$, and $h_2(\delta_p^*-\delta_p)$.

14. The Uninterruptible Power Supply unit of claim 13 wherein said controller further comprises a switch vector selector to receive said flux vector control signals and produce said gate drive signals for said inverter.

15. A method of sharing power between a plurality of Uninterruptible Power Supply units without communicating between said Uninterruptible Power Supply units, each of said Uninterruptible Power Supply units being connected in parallel to a power bus carrying a power signal, said method comprising the steps of:

identifying at each of said Uninterruptible Power Supply units a frequency error signal corresponding to the difference between the operating frequency of said power signal and a target frequency for said power signal; and producing at each of said Uninterruptible Power Supply units a frequency restoration reference signal, wherein said producing step includes the step of
changing at each of said Uninterruptible Power Supply units the power rating of the Uninterruptible Power Supply unit to form a target power rating signal ($P_{oi}$) that is equivalent to the actual power level at the Uninterruptible Power Supply unit wherein said changing step includes the step of
integrating the product of a frequency restoration constant (k), a nominal power rating value ($P_{iR}$), and said frequency error signal to produce said target power rating signal(Poi).

16. The method of claim 15 further comprising the steps of:

subtracting said target power rating signal ($P_{oi}$) from a reference power rating signal ($P_{oi}^*$) to form a power rating error signal;

multiplying said power rating error signal by a gain value ($k_i$) to produce a power rating feedback signal; and adding said power rating feedback signal to said frequency error signal.

17. An Uninterruptible Power Supply unit for connection to an Uninterruptible Power Supply system that includes a plurality of similarly controlled Uninterruptible Power Supply units that do not have communication links between them, said Uninterruptible Power Supply unit comprising:

a power bus node for connection to a power bus that has a plurality of loads and said plurality of Uninterruptible Power Supply units connected thereto, said power bus intermittently carrying a drooping power signal with an operating frequency distinct from a nominal power signal frequency;

an inverter connected to said power bus node; and a controller including
a first control mechanism to modify an actual power rating signal of said Uninterruptible Power Supply unit in response to said drooping power signal, and a second control mechanism to process said actual power rating signal and generate a frequency restoration reference signal that is used to produce gate drive signals for said inverter.

18. The Uninterruptible Power Supply unit of claim 17 wherein said first control mechanism receives a nominal power signal frequency signal($\omega_o$), an actual power signal frequency signal ($\omega_i$), and an actual power level loading signal ($P_i$) measured locally at said Uninterruptible Power Supply unit.

19. The Uninterruptible Power Supply unit of claim 18 wherein said first control mechanism subtracts said actual power signal frequency signal from said nominal power signal frequency signal to produce a delta power signal frequency signal ($\Delta\omega_i$).

20. The Uninterruptible Power Supply unit of claim 19 wherein said first control mechanism multiplies said delta power signal frequency signal($\Delta\omega_i$) by the product of a frequency restoration constant(k) and a nominal power rating value ($P_{iR}$) to yield a first intermediate frequency restoration signal.

21. The Uninterruptible Power Supply unit of claim 20 wherein said first control mechanism integrates said first intermediate frequency restoration signal to produce said actual power rating signal ($P_{oi}$).

22. The Uninterruptible Power Supply unit of claim 21 wherein said second control mechanism subtracts said actual power level loading signal ($P_i$) from said actual power rating signal ($P_{oi}$) to produce a power difference signal.

23. The Uninterruptible Power Supply unit of claim 22 wherein said second control mechanism multiplies said power difference signal by the slope ($m_i$) of a frequency-power curve to yield a generated frequency value signal.

24. The Uninterruptible Power Supply unit of claim 23 wherein said second control mechanism subtracts said generated frequency value signal from said nominal power frequency signal value signal ($\omega_o$) to produce said frequency restoration reference signal ($\omega_i^*$).

25. The Uninterruptible Power Supply unit of claim 24 wherein said first control mechanism subtracts said actual power rating signal ($P_{oi}$) from a reference power rating signal ($P_{oi}^*$) to produce a power rating error signal.

26. The Uninterruptible Power Supply unit of claim 25 wherein said first control mechanism multiplies said power rating error signal by a gain value ($k_i$) to produce a power rating feedback signal.

27. The Uninterruptible Power Supply unit of claim 26 wherein said first control mechanism adds said power rating feedback signal to said delta power frequency signal ($\Delta\omega_i$).

\* \* \* \* \*